Dec. 6, 1938.  C. SCHMITTUTZ  2,139,422
PROCESS FOR PRESERVING STANDING POLES
Filed March 26, 1935

INVENTOR
CARL SCHMITTUTZ
BY
ATTORNEY

Patented Dec. 6, 1938

2,139,422

UNITED STATES PATENT OFFICE 2,139,422

PROCESS FOR PRESERVING STANDING POLES

Carl Schmittutz, Bad Kissingen, Germany, assignor, by mesne assignments, to General Osmose Corporation, Dover, Del., a corporation of Delaware Application March 26, 1935, Serial No. 13,110
In Germany July 16, 1930

1 Claim. (Cl. 21—13)

The invention relates in general to the preservation of wood and in particular to a process for the preservation of poles, such for example as telegraph poles which are standing and in use.

It is a general object of the invention to provide a process for the preservation of used and standing poles by the application of a preservation to the pole in such a manner that the pole is impregnated throughout its entire length with a preservative in such concentration as to inhibit attack by insects and fungus organisms.

It is another object of the invention to provide a process for the preservation of used and standing poles by applying to the wood a preservative in the form of a tacky paste having an ingredient adapted to penetrate the wood by osmosis to a substantial depth and an agent to bring about the intimate and uniform contact of the preservative with the wood.

It is a specific object of the invention to retard the decay of used and standing poles by treating simultaneously the top of the poles and the area in contact with the ground, the preservative being applied in such a manner as to prevent its substantial loss to the earth surrounding the pole.

It is another specific object of the invention to provide a composition adapted to be positioned on the top of a standing pole and to be acted upon by rain to form a preservative solution for impregnating the pole, the composition being characterized by retaining its effectiveness for a long period of time.

Other objects of the invention will in part be obvious and will in part appear hereinafter.

According to the invention, a pole standing with an end in contact with the ground is preserved by having its exposed top end covered with a viscous tacky paste comprising a preservative adapted to be dissolved by the rain to form a preservative solution which runs down the pole and impregnates the wood. The area of the pole at and adjacent the ground line is coated with a tacky paste comprising a preservative, a paste-forming glutinous substance and water, and the paste tightly enclosed in a waterproof covering. By the conjoint action of the top and ground line treatment the entire length of the pole is impregnated to a substantial depth. In the preferred embodiment of the process, the paste for the top and/or ground line treatment comprises, in addition to the above named ingredients, a protective agent comprising a water-insoluble, preferably organic, liquid which is adapted to penetrate the wood by capillary flow and form a waterproof zone to prevent the leaching out of the water-soluble preservative.

For a more complete understanding of the nature and objects of the invention, reference should be had to the accompanying drawing, in which.

Figure 1:
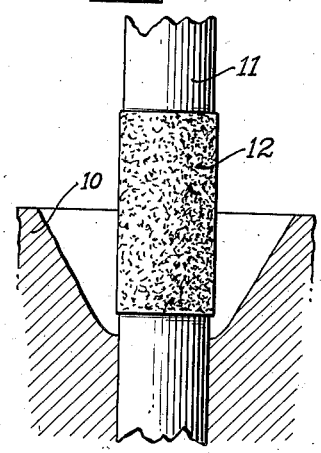
Fig. 1 is a view partly in section showing a standing pole which has been treated with paste at the ground line in accordance with the invention.
Figure 2:
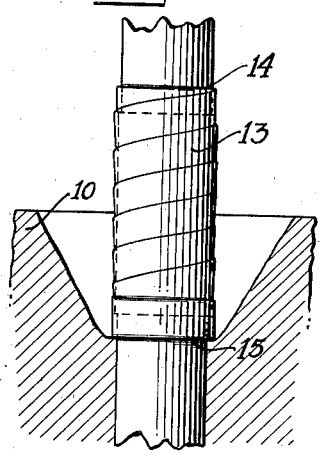
Fig. 2 is a view, partly in section, showing the pole of Fig. 1, after the paste has been enclosed in a waterproof covering.

Referring to Fig. 1, the earth 10 is excavated from about the base of a standing pole 11 so as to expose a section of the wood about two feet below the ground line. The decayed portions of the wood may be scraped away and a layer 12 of an aqueous tacky paste is placed completely around the pole from a point near the bottom of the excavation to a point about one foot above the normal ground line. The paste is enclosed tightly in a waterproof covering 13, which is preferably a bandage wound spirally about the pole, beginning at a point 14 well above the area covered by the paste and extending to a point 15 well below the paste, as shown in Fig. 2.

The waterproof bandage may be fashioned as a flexible strip of any suitable material such as paper, leather, cloth, asbestos and which is impregnated or coated with a waterproofing composition such for example as bitumen, tar, liquid petroleum, paraffin and like. The excavation may now be filled but the earth should not extend above the top of the waterproof covering.

It should be noted that according to the present invention, the aqueous paste is applied directly to the surface of the wood and the waterproof covering is then wound directly and tightly over the paste so that the earth may be packed down tightly to support adequately the pole. Since the covering is waterproof and extends well above and below the area covered by the paste, the water-soluble compounds in the paste are prevented from leaching outwards or downwards into the ground. The natural moisture in the wood together with water carried in the paste is sufficient to cause the preservative to penetrate the wood to a substantial depth.

Figure 3:
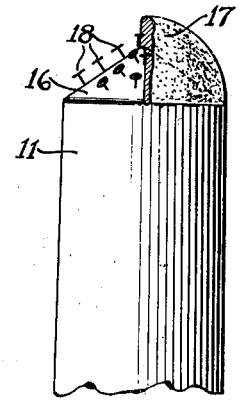
Fig. 3 is a detailed view of one method of applying the paste to the top of a standing pole.
Figure 5:
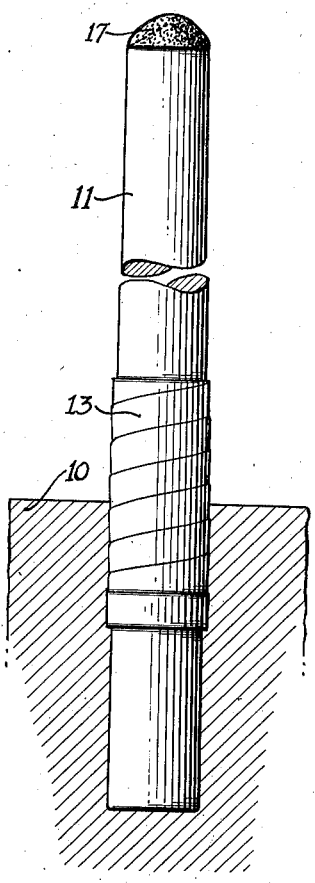
Fig. 5 is a view, partly in section, of a standing pole treated at the top and at the ground line in accordance with the invention.

The invention further contemplates the treatment of that section of the pole which is exposed to the atmosphere. Referring to Fig. 3, the top 16 of a standing pole 11 is tapered substantially to a point as shown and the top covered with a substantial layer 17 of an aqueous tacky paste comprising a water-soluble wood preservative, a paste-forming glutinous substance, water, and preferably also a water-insoluble liquid protective agent. When the composition is acted upon by the rain there is formed a solution of the wood preservative which flows down the pole and simultaneously impregnates the wood from the top of the pole to the ground line as shown in the drawing.

Figure 4:
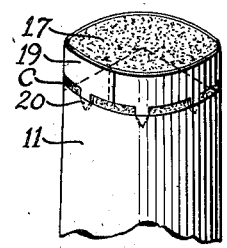
Fig. 4 is a detailed view of a second method of applying the paste to the top of a standing pole.

There may be provided means for maintaining the paste in position on top of the pole without excluding rain from acting on the composition. For example, a plurality of nails 18 is driven into the wood and serves to anchor the paste applied thereover as shown in Fig. 3. Alternatively, a sheet metal flange 19 having a plurality of sharp projections 20 on one edge may be bent to encircle the top of the pole and the projections driven into the wood as shown in Fig. 4 to provide a small clearance C between the bottom of the flange and the wood. The paste is put in the cup thus formed on top of the pole and when the composition is acted upon by the rain, the solution which forms will flow out at the base of the cup and down the sides of the pole. The metal flanges 19 may be supplied in continuous strip form from which suitable lengths are cut as required to encircle a pole of any circumference. If desired, the cup may be provided with a cover pierced with suitable holes to allow the rain to pass, but to reduce the effects of wind and sand on the composition.

Figure 6:
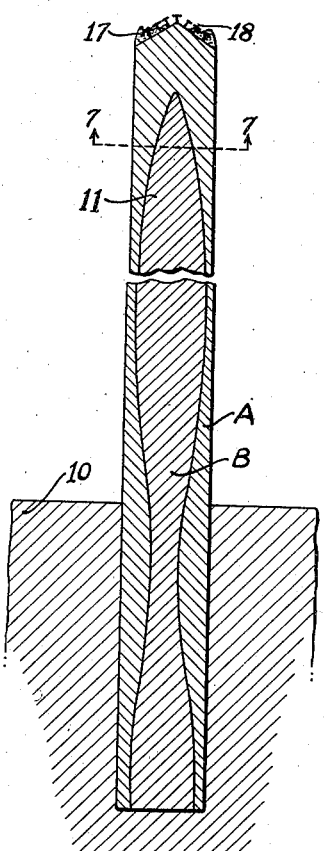
Fig. 6 is a view in section of the pole of Fig. 5 after the impregnation has taken place.
Figure 7:
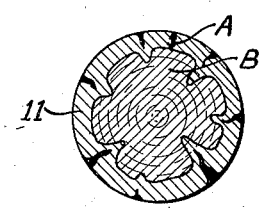
Fig. 7 is a cross section of the pole of Fig. 6 taken along the line 7—7 thereof.

Referring now to Fig. 6 and Fig. 7, it will be observed that when the composition on top of the pole is acted upon by rain, the soluble components of the composition dissolve and form a preservative solution which runs down the outer surface of the pole and simultaneously diffused into the wood through the end. The water-soluble preservative penetrates the wet wood by osmosis to a substantial depth in the area designated A. The unimpregnated area is designated B. Any water-insoluble liquid protective agent contained in the composition will be loosened by the dissolution of the water-soluble component and flow down the pole to impregnate the wood by capillary diffusion. Cracks in the wood are penetrated by the solution and the wood is deeply impregnated at these points as shown in Fig. 7.

For the preservative agent, there is employed a water soluble inorganic wood preservative substance such, for example, as sodium or potassium fluoride, zinc chloride. The preservative includes water soluble inorganic fungicides such, for example, as copper sulphate, potassium sulphide, mercuric chloride, zinc fluorosilicate. If desired, the preservative may comprise one or more insecticides such, for example, as a water soluble arsenic salt such as sodium or potassium arsenite, sodium or potassium arsenate. The water soluble substances may be employed either singly or in admixture. The inorganic substance should be preferably one with high solubility in water and high mobility, that is, high osmotic pressure and rate of diffusion.

Further, the invention contemplates the use of tacky pastes comprising two or more soluble inorganic wood preservative substances capable of reacting to form within the wood an insoluble or difficultly soluble product. For example, with a fluoride or an arsenate, there may be used a water soluble, inorganic dichromate such as sodium or potassium dichromate. It would appear that the dichromate salt reacts with the fluoride or arsenate to form a difficultly soluble product having the general structure of a cryolite compound.

For the protective agent, there is employed an organic liquid such, for example, as dinitrophenol, dinitrocresol, tar oils, or liquid petroleum. The protective agent is preferably one which is substantially insoluble in water or incompletely miscible therewith, and which has a low viscosity and a high toxicity toward fungi and insects. The expression "water insoluble organic substance" shall include organic substances having a relatively slight solubility in water when compared to the water soluble preservative agents herein disclosed.

The paste-forming ingredient comprises preferably a glutinous substance capable of forming a water swelling colloid such, for example, as starch, dextrine, disintegrated casein, glue, gelatine, agar agar, or gum arabic. These ingredients are adapted to give a tacky paste with water and may be used singly or in admixture with each other.

In general, the preservative agent comprises from about 50% to 80%, the protective agent from about 10% to 35% and the paste-forming glutinous substance from about 5% to 30% by weight.

By way of illustration, but not by way of limiting the scope of the invention, the following examples are given, the ingredients being in parts by weight:

| Examples | I | II | III | IV | V | VI |
|---|---|---|---|---|---|---|
| Sodium fluoride | 900 | 900 | 900 | | | |
| Sodium arsenate | | | | 100 | 50 | 150 |
| Sodium dichromate | | 350 | | | 40 | |
| Dinitrophenol | | 170 | 170 | 50 | 35 | 70 |
| Gum arabic | 130 | | | 30 | | |
| Disintegrated casein | | 150 | | | 10 | |
| Starch | | | 80 | | | |

Four parts of the several ingredients above given are ground and mixed thoroughly with from four to six parts of water to give a paste of the required viscosity, and preferably one having a high degree of tackiness.

If desired, the paste may comprise a hygroscopic wetting agent such, for example, as glycerine, the glycols, calcium chloride and the like to assist in bringing the preservative and the protective agent into more intimate contact with the wood. The hygroscopicity of the wetting agent retards the drying out of the paste and continuously absorbs moisture from the air, thus prolonging the action of the preservative. There may be added also, if desired, substances adapted to color the wood or to render the same fireproof, mothproof, etc. The composition above described is disclosed and claimed in my prior Patent No. 2,012,976, issued Sept. 3, 1935.

While the composition above described is suitable for use on top of standing poles in accordance with the process of the invention, I have found that the preservation of the pole is prolonged by the use for the top protection of a composition comprising a plurality of water-soluble preservatives having widely different solubilities in water, together with a suitable paste forming glutinous substance and water to form a viscous paste. For example there may be used a composition comprising at least one compound having a solubility of less than 5 grams in 100 grams of water and at least one compound having a solubility greater than 5 grams and preferably over 10 grams in 100 grams of water. As examples of compounds having a low solubility there may be given potassium dichromate, cupric fluorsilicate, potassium ortho phosphate, mercuric chloride. Of the more soluble compounds there may be given as examples, potassium arsenate, potassium arsenite, potassium fluoride, sodium silicate, zinc chloride, sodium fluoride, cupric sulphate. Following the principles laid down herein other suitable compounds can be selected by those skilled in the art without transcending the scope of the invention.

When a composition containing compounds of widely different solubilities is acted upon by the rain, the several compounds dissolve in proportion to their natural solubilities, assuming an absence of common ion effects. Accordingly, the compound of greater solubility will be rapidly used up while the compound of lesser solubility will be used up only after a long period of time. Thus upon the occasion of the first rains, the compound of greater solubility will form a solution and impregnate the wood promptly. The leaching out of the paste of the soluble compound will leave the composition porous so that with each subsequent rain the compound of lesser solubility will be dissolved to form a solution which will run down the pole and augment the impregnation achieved by the more soluble compound and maintain the wood in a sterile condition. By this conjoint use of compounds of different solubility the effective life of the composition is increased.

It should be noted that the paste-forming glutinous substance used in the paste dries on the evaporation of the water to form a hard horny coating over the particles of the preservative and protective agent. This coating prevents the disintegration of the mass and prevents the dislodgement of the mass by wind. Moreover this ingredient serves to bind into one unitary compound two substances which are immiscible in water and enables the mixture to be brought into intimate, permanent and uniform contact with the wood. The glutinous substance imbibes a substantial amount of water with each rain and prolongs the action of the preservative.

The process of the invention is applicable for the preservation of poles formed of various types of woods, such, for example as pine, fir, spruce, larch, beech, oak, ash, gum-wood, etc. The poles when treated may be green or dried, new or used, treated or untreated previously with preservatives. In the appended claim the expression "standing pole" is intended to include telegraph poles, fence posts, mine timbers and underpinnings, hop poles, and wooden timbers in general which have an end in contact with or embedded in the ground.

I claim:

In a process for the preservation of standing wooden poles, the steps comprising applying to the top area of a standing pole a coating consisting of an aqueous tacky paste comprising a plurality of inorganic wood preservatives which exhibit widely different solubility when acted upon by the rain, a paste forming glutinous substance and water, and leaving said coating exposed to rain so that the latter is utilized to form a preservative solution of said wood preservative which flows down the pole and simultaneously impregnates the wood, said process being characterized in that the preservatives used are selected so that the leaching out of the paste of the more soluble preservative will leave the composition porous so that, with each subsequent rain, the more difficultly soluble preservative will be dissolved to form a solution which will run down the pole and augment the impregnation achieved by previous distribution of the more soluble compounds.

CARL SCHMITTUTZ.